(12) United States Patent
Li et al.

(10) Patent No.: US 10,484,154 B2
(45) Date of Patent: Nov. 19, 2019

(54) PREAMBLE CONFIGURATION METHOD, TRANSMISSION METHOD AND RELATED DEVICE

(71) Applicant: YULONG COMPUTER TELECOMMUNICATION SCIENTIFIC (SHENZHEN) CO., LTD., Shenzhen (CN)

(72) Inventors: Ming-Ju Li, Shenzhen (CN); Ya-Jun Zhu, Shenzhen (CN); Yun-Fei Zhang, Shenzhen (CN)

(73) Assignee: YULONG COMPUTER TELECOMMUNICATION SCIENTIFIC (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 16/090,247

(22) PCT Filed: Nov. 30, 2016

(86) PCT No.: PCT/CN2016/107808
§ 371 (c)(1),
(2) Date: Sep. 29, 2018

(87) PCT Pub. No.: WO2017/166839
PCT Pub. Date: Oct. 5, 2017

(65) Prior Publication Data
US 2019/0116010 A1    Apr. 18, 2019

(30) Foreign Application Priority Data
Apr. 1, 2016   (CN) .......................... 2016 1 0204151

(51) Int. Cl.
*H04L 5/00*       (2006.01)
*H04L 27/26*      (2006.01)
(Continued)

(52) U.S. Cl.
CPC ........ *H04L 5/0048* (2013.01); *H04L 27/2613* (2013.01); *H04W 74/085* (2013.01); *H04L 5/001* (2013.01); *H04W 74/006* (2013.01)

(58) Field of Classification Search
CPC ... H04L 5/0048; H04L 27/2613; H04L 5/001; H04L 5/0094; H04L 5/0053;
(Continued)

(56) References Cited

U.S. PATENT DOCUMENTS

2018/0014279 A1* 1/2018 Xia ..................... H04W 72/005
2018/0332626 A1* 11/2018 You ................... H04W 74/0833
(Continued)

FOREIGN PATENT DOCUMENTS

CN    104968052 A    10/2015
CN    105050190 A    11/2015
(Continued)

*Primary Examiner* — Walli Z Butt
(74) *Attorney, Agent, or Firm* — ScienBiziP, P.C.

(57) ABSTRACT

An embodiment of the present disclosure provides a preamble configuration method on an unlicensed carrier, the method includes: configuring a Physical Random Access Channel (PRACH) configuration message, the PRACH configuration message including subframe location information, first Clear Channel Assessment (CCA) interval location information, a channel detection mechanism, preamble format information, and preamble sending location information. The subframe location information indicates a location of a subframe where M to-he-transmitted preambles are located, The first CCA interval location information represents a location of a CCA interval before each preamble in the M to-be-transmitted preambles on the subframe or on a previous subframe of the subframe. The channel detection mechanism is used for indicating whether user equipment detects that the unlicensed carrier is in an idle state. The
(Continued)

preamble format information indicates that the to-be-transmitted preambles are format 4 preambles.

20 Claims, 10 Drawing Sheets

(51) Int. Cl.
 *H04W 74/08* (2009.01)
 *H04W 74/00* (2009.01)
(58) Field of Classification Search
 CPC ............ H04L 27/2602; H04W 74/085; H04W 74/006; H04W 74/0833; H04W 74/0808
 See application file for complete search history.

(56) References Cited

U.S. PATENT DOCUMENTS

| | | | |
|---|---|---|---|
| 2019/0053284 A1* | 2/2019 | Wang | H04W 72/0446 |
| 2019/0116614 A1* | 4/2019 | Li | H04W 76/27 |
| 2019/0132103 A1* | 5/2019 | Yang | H04L 5/0037 |

FOREIGN PATENT DOCUMENTS

| | | |
|---|---|---|
| CN | 105704834 A | 6/2016 |
| WO | 2016028060 A1 | 2/2016 |

\* cited by examiner

PREAMBLE CONFIGURATION METHOD, TRANSMISSION METHOD AND RELATED DEVICE

CROSS-REFERENCE TO RELATED APPLICATIONS

This application claims priority of Chinese Patent Application No. 201610204151.8, entitled "PREAMBLE CONFIGURATION METHOD, TRANSMISSION METHOD AND RELATED DEVICE," filed on Apr. 1, 2016 in the SIPO (State Intellectual Property Office of the People's Republic of China), the entire contents of which are incorporated by reference herein.

FIELD

The embodiments of the present disclosure relates to a technical field of communication, specifically a preamble configuration method, a transmission method and a related device on an unlicensed carrier.

BACKGROUND

With a sharp increase of communication traffic, a 3rd Generation Partnership Project (3GPP) licensed frequency spectrum is more and more insufficient to provide higher network capacity. In order to further improve utilization of frequency spectrum resources, the 3GPP is discussing how to use unlicensed frequency spectrums, such as 2.4 GHz frequency bands and 5.8 GHz frequency bands, with help of licensed frequency spectrums. The unlicensed frequency spectrums are currently mainly used in systems such as Wi-Fi, BLUETOOTH™, radar, medical care, etc. Generally, an access technology designed for the licensed frequency band, such as a Long Term Evolution (LTE) is not suitable for using in the unlicensed frequency band, due to a fact that such access technologies like the LTE require quite high spectrum efficiency and user experience optimization requirement. However, a carrier aggregation function makes it be possible to deploy the LTE in the unlicensed frequency band. The 3GPP proposes a concept of Licensed-Assisted Access (LAA), the unlicensed frequency spectrum is used with the help of a LTSENDABLEE licensed frequency spectrum.

Interference level is guaranteed due to good orthogonality in a LTE network, then an uplink and downlink transmission between a base station and a user does not need to consider whether there is a base station around or a user is transmitting. When the LTE is used in the unlicensed frequency band, it is also not considered whether other devices are used in the unlicensed frequency band, then great interference is brought to a Wi-Fi device. As long as the LTE has business, it transmits without any monitoring rules, then the Wi-Fi device cannot transmit when the LTE has a service transmission. Only when a LTE service transmission is completed, it can detect an idle state of a channel and perform transmission.

Therefore, when the unlicensed frequency band is used by the LTE, one of main keys is to ensure that the LAA can coexist with existing access technologies (such as Wi-Fi) on a fair and friendly basis. A traditional LTE system does not have a mechanism of Listen Before Talk (LBT) to avoid collisions. In order to better coexist with Wi-Fi, the LTE requires an LBT mechanism. Then, when the channel is detected to be busy on an unlicensed carrier by the LTE, the frequency band cannot be occupied, and when the channel is detected to be idle, the frequency band can be occupied. A prior art does not provide a solution for sending a preamble on the unlicensed carrier, therefore how to perform random access on an uplink transmission preamble on the unlicensed carrier is a currently researched hotspot.

SUMMARY

A technical problem to be solved by embodiments of the present disclosure is to provide a preamble configuration method on an unlicensed carrier, a reception method, a base station and user equipment, thus access time delay of the user equipment can be reduced.

In order to solve the above technical problem, an embodiment of the present disclosure provides a preamble configuration method on an unlicensed carrier, the method includes that:

A base station configures a Physical Random Access Channel (PRACH) configuration message, the PRACH configuration message including subframe location information, first Clear Channel Assessment (CCA) interval location information, a channel detection mechanism, preamble format information, and preamble sending location information. The subframe location information indicates a location of a subframe where M to-be-transmitted preambles are located. The subframe is an uplink subframe, a special subframe or a downlink partial subframe. The first CCA interval location information represents a location of a CCA interval before each preamble in the M to-be-transmitted preambles on the subframe or on a previous subframe of the subframe. The channel detection mechanism is used for indicating whether user equipment detects that the unlicensed carrier is in an idle state. The preamble format information indicates that the to-be-transmitted preambles are format 4 preambles. The preamble sending location information indicates sending locations of the M to-be-transmitted preambles in the subframe, M is an integer that is larger than 0.

The base station sends control signaling carrying the PRACH configuration message to the user equipment. The control signaling includes Radio Resource Control (RRC) signaling and/or Digital Copyright Identifier (DCI) signaling.

Correspondingly, an embodiment of the present disclosure further provides a preamble reception method on an unlicensed carrier, the method includes that:

User equipment receives control signaling carrying a PRACH configuration message sent by a base station on a current carrier. The control signaling includes a RRC signaling and/or a DCI signaling. The PRACH configuration message includes subframe location information, first CCA interval location information, a channel detection mechanism, preamble format information, and preamble sending location information. The subframe location information indicates a subframe where M to-be-transmitted preambles are located. The subframe is an uplink subframe, a special subframe or a downlink partial subframe. The first CCA interval location information represents a location of a CCA interval before each preamble in the M to-be-transmitted preambles on the subframe or on a previous subframe of the subframe. The channel detection mechanism is used for indicating whether the user equipment detects that the unlicensed carrier is in an idle state. The preamble format information indicates that the preambles are format 4 preambles. The preamble sending location information indicates at least 1 sending location of the to-be-transmitted format 4 preambles in the subframe.

The user equipment determines the location of the CCA interval before the M to-be-transmitted preambles based on the subframe location information and the first CCA interval location information. The user equipment detects a state of the unlicensed carrier in the CCA interval before the M to-be-transmitted preambles according to the channel detection mechanism.

When the unlicensed carrier is detected to be in an idle state in the CCA interval before the to-be-transmitted preambles, the user equipment acquires a preamble corresponding to the preamble format information, and sends the preamble to the base station according to an indication of the preamble sending location information.

BRIEF DESCRIPTION OF THE DRAWINGS

In order to describe the technical solutions in embodiments of the present disclosure or in the prior art more clearly, the following briefly introduces the accompanying drawings needed for describing the embodiments. The accompanying drawings in the following description show some embodiments of the present disclosure, and persons of ordinary skill in the art may still derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. The described embodiments are a part rather than all of the embodiments of the present disclosure. All other embodiments acquired by persons of ordinary skill in the art based on the embodiments of the present disclosure without creative efforts shall fall within the protection scope of the present disclosure.

Figure 1A:
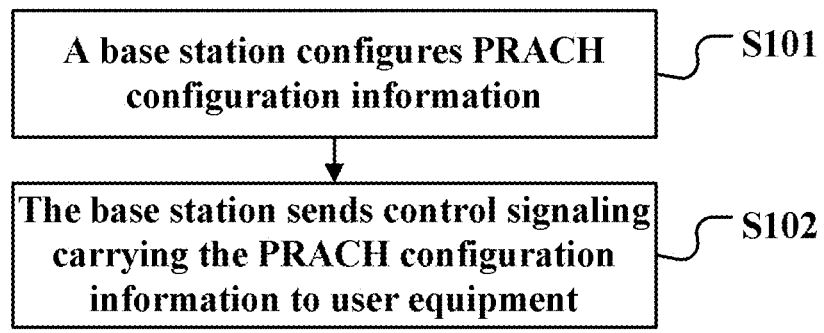
FIG. 1a is a flow diagram of a preamble configuration method on an unlicensed carrier provided in an embodiment of the present disclosure.

FIG. 1a shows a flow diagram of a preamble configuration method on an unlicensed carrier provided in an embodiment of the present disclosure, the method includes that:

S101, a base station configures Physical Random Access Channel (PRACH) configuration information.

Specifically, the PRACH configuration message is used to indicate relevant parameters of a preamble to be sent. The PRACH configuration message includes subframe location information, first Clear Channel Assessment (CCA) interval location information, a channel detection mechanism, preamble format information and preamble sending location information. The subframe location information indicates a location of a subframe where M to-be-transmitted preambles are located, namely, user equipment can send one or more preamble on one subframe. In one embodiment, the subframe location information can be represented by a wireless frame number and a subframe number. For example, a frame corresponding to the wireless frame number can be any, odd-numbered or even-numbered frame. The subframe number indicates a location of the subframe in the wireless frame. For example, one wireless frame includes ten subframes, numbers being 0-9, the subframe location information is 0 indicates that a subframe in the wireless frame whose subframe number is 0. In the embodiment of the present disclosure, the subframe is an uplink subframe, a special subframe or a downlink Partial subframe. In another possible embodiment, the subframe location information can be represented not by the wireless frame number and the subframe number, but by a relative displacement of a current subframe. For example, a subframe used for sending the PRACH by Downlink Control Information (DCI) signaling is a displacement of the next three subframes relative to a subframe currently used for sending the DCI signaling. That is, if the subframe number used for sending the DCI signaling is N, then the subframe used for sending preamble is N+3. The first CCA interval location information represents a location of a CCA interval in the M to-be-transmitted preambles on the subframe. M is an integer larger than 0. The M CCA intervals are on the subframe indicated by the subframe location information or the previous subframe of the subframe, and the location of the M CCA intervals can be a preset fixed symbol location, or an unfixed symbol location. The preamble format information indicates formats of M to-be-transmitted preambles, and specifically includes a preamble format and a preamble index number. In the embodiment of the present disclosure, the M to-be-transmitted preambles are defined as format 4 preambles. The channel detection mechanism indicates whether the user equipment can detect the unlicensed carrier being in an idle state. A detection method can be a one-shot CCA mechanism or Listen Before Talk (LBT) C4 mechanism based on a random number N. The preamble sending location information indicates a sending location of the M to-be-transmitted preambles on the subframe. The sending location can be M fixed symbol locations preset on the subframe or M unfixed symbol locations.

Figure 1B:
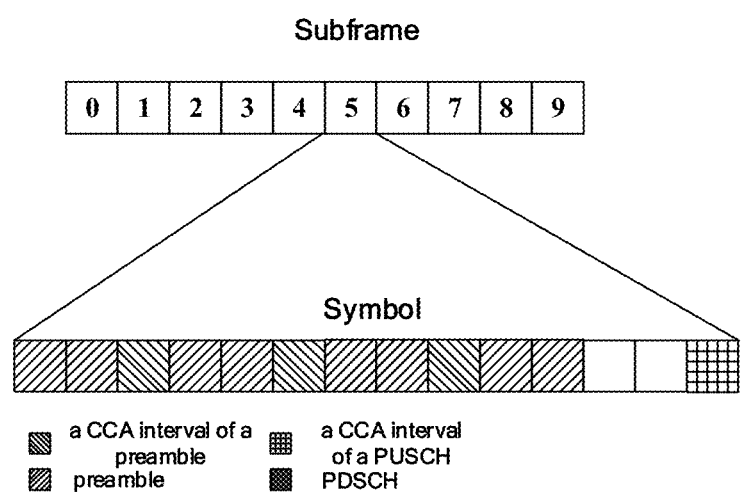
FIG. 1b-FIG. 1e is a schematic location diagram of a Clear Channel Assessment (CCA) interval configured on a subframe by a base station.

FIG. 1b shows an example embodiment of the related parameters in the Physical Random Access Channel (PRACH) configuration information configured by a base station. The subframe corresponding to subframe location information configured by a base station is a subframe 5, and the base station configures the sending location of the four to-be-transmitted preambles on the subframe 5 as a fixed symbol location, that is, the number of the locations of the to-be-transmitted preambles is four, and the number of the CCA interval locations before the to-be-transmitted preambles is also 4. The to-be-transmitted preamble on a first sending location, and the symbol 13 of a previous CCA interval occupied by a subframe 4 (not given in the figure), a symbol 0-1 of the subframe 5. The to-be-transmitted preamble on a second sending location, and the symbol 2-4 of the previous CCA interval occupied by the subframe 5. The to-be-transmitted preamble on a third sending location, and the symbol 5-7 of the previous CCA interval occupied by the subframe 5. The to-be-transmitted preamble on a fourth sending location, and the symbol 8-10 of the previous CCA interval occupied by the subframe 5. A CCA interval of a to-be-transmitted Physical Uplink Shared Channel (PUSCH) is located at the end of the subframe 5, which occupies one symbol.

Figure 1C:
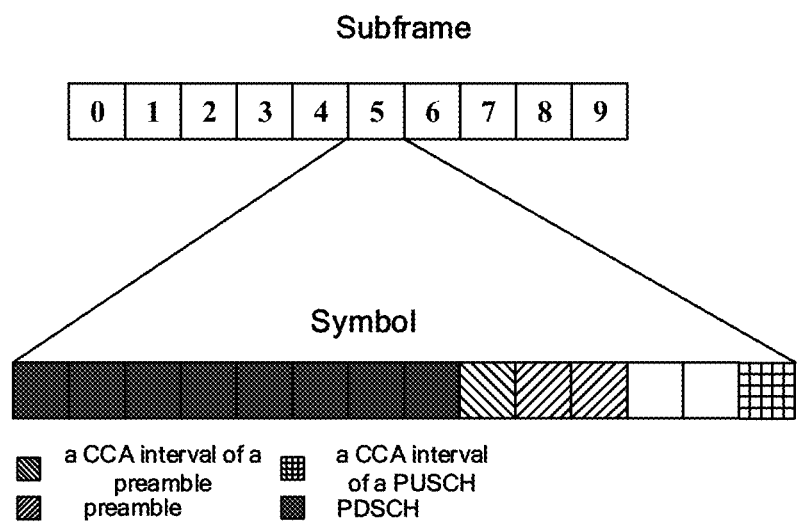

FIG. 1c shows an example embodiment of the related parameters in the PRACH configuration message configured by a base station. The difference between FIG. 1c and FIG. 1b is that on the basis that the base station configures the sending location of the M to-be-transmitted preambles as the fixed symbol location, when the previous sending location is occupied by a downlink subframe Physical Downlink Shared Channel (PDSCH), then the user equipment can only carry out channel detection in the CCA corresponding to a remaining sending location.

Figure 1D:
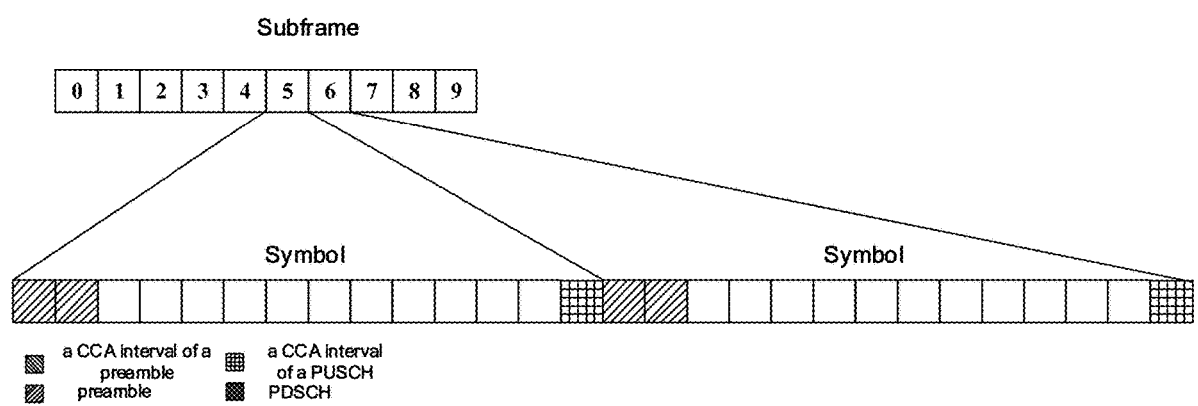

FIG. 1d shows an example embodiment of the related parameters in the PRACH configuration message configured by a base station. The subframe corresponding to subframe location information configured by a base station is a subframe 5, and the base station configures the sending location of the to-be-transmitted preambles as an unfixed symbol location. A CCA interval before the to-be-transmitted PUSCH is located at the end of the subframe 5, which occupies one symbol. When the user equipment detects an unlicensed spectrum channel to be idle in the CCA interval before the to-be-transmitted PUSCH, the user equipment can also send preambles on the location (two symbols in the header of a subframe 6) of the to-be-transmitted preambles of the subframe 6. When the user equipment detects the unlicensed spectrum channel to be busy, continues to detect, until detects to be idle. But after detecting to be idle, remaining time of the subframe must meet the length of the format 4 preamble. When the remaining time cannot meet the length of the format 4 preamble, and when detecting to be idle, the format 4 preamble cannot be sent. Optionally, when the remaining time of the subframe 6 cannot meet the length of the format 4 preamble, it is unnecessary to detect the state of the unlicensed spectrum channel, and the format 4 preamble cannot be sent even if it is idle. The remaining time is to remove the CCA time of PUSCH that occupies the tail symbol of the subframe.

Figure 1E:
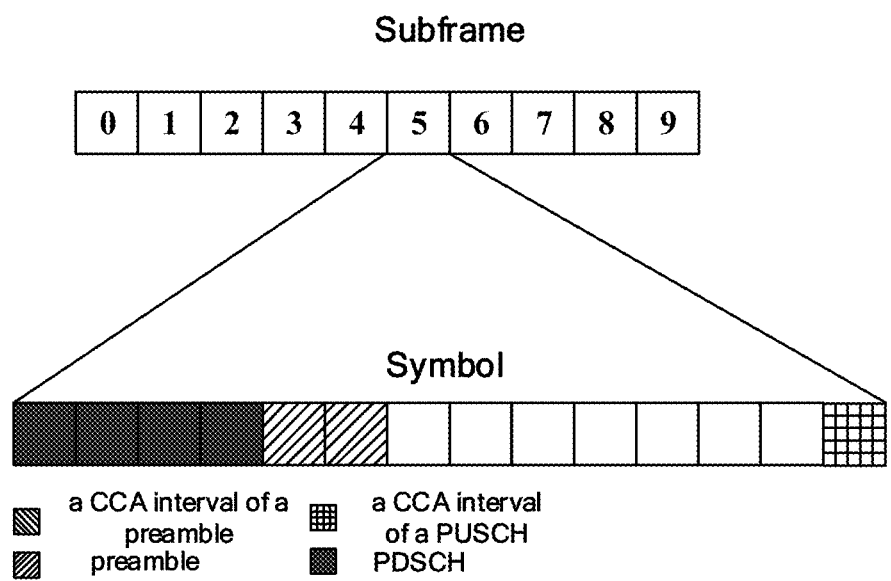

FIG. 1e shows an example embodiment of the related parameters in the PRACH configuration message configured by a base station. The difference between FIG. 1e and FIG. 1d is that when the subframe (the subframe 5) corresponding to the subframe location information is occupied by the downlink subframe PDSCH, detection time of the CCA interval before the to-be-transmitted preambles starts from the end location of the PDSCH, and the unlicensed spectrum channel is detected to be idle in the CCA interval, then sending preambles. Similarly, when the remaining time of the subframe is less than the length of the preambles in format 4 (that is, a little more than two symbols), the preamble cannot be sent, and it is unnecessary to detect the state of the unlicensed spectrum channel.

The remaining time is to remove the CCA time of PUSCH that occupies the tail symbol of the subframe.

Step 102, a base station sends control signaling carrying the PRACH configuration message to user equipment.

Specifically, the base station sends the control signaling carrying the PRACH configuration message to the user equipment, the control signaling includes Radio Resource Control (RRC) signaling and/or Digital Copyright Identifier (DCI) signaling. That is to say, the relevant parameters in the PRACH configuration message can be all carried by the RRC signaling, or all carried by the DCI signaling, or both. Some of the relevant parameters are carried in the RRC signaling, and the remaining relevant parameters are carried in the DCI signaling. The specific allocation can be made by the base station according to need, and the present disclosure is not restricted. In a possible distribution solution of an embodiment of the present disclosure, the RRC signaling carries the CCA interval location information, the channel detection mechanism, the preamble format information and the preamble sending location information, but the DCI signaling carries the subframe location information.

Optionally, the control signaling also includes PUSCH configuration message, and the PUSCH configuration message includes: a second CCA interval location information, and the second CCA interval location information represents the location of the CCA interval before the to-be-transmitted PUSCH configured by the base station to a user on the subframe or the previous subframe. The CCA interval before the to-be-transmitted PUSCH occupies at most N symbols at the head of the subframe or at the tail of the previous subframe of the subframe.

Optionally, the CCA interval before the to-be-transmitted PUSCH is used to send the PUSCH. The PUSCH can be sent only when the unlicensed spectrum channel is idle in the CCA interval. The CCA interval occupies the head of the subframe indicated by the subframe location information, or the end of the previous subframe of the subframe indicated by the subframe location information, the CCA interval occupies at most N symbols, the CCA interval can occupy an integer or a non-integer symbol.

Optionally, the length of CCA interval before each to-be-transmitted preamble is less than or equal to the length of CCA interval before the to-be-transmitted PUSCH.

Specifically, the length of each CCA interval before M to-be-transmitted preambles is less than or equal to the length of CCA interval before the to-be-transmitted PUSCH.

Optionally, the CCA interval before each to-be-transmitted preamble and the corresponding to-be-transmitted preamble occupy consecutive N+2 symbols.

Specifically, each CCA interval before M to-be-transmitted preambles and the corresponding preamble occupied N+2 symbols. For example, as shown in FIG. 1a, in the subframe 5, there are 3 to-be-transmitted preambles, each to-be-transmitted preamble corresponds to 1 CCA interval. For a first sending location, a CCA interval and a corresponding preamble occupy 3 consecutive symbols.

Optionally, N is 1 or 2.

Optionally, M=1. The CCA interval before the to-be-transmitted PUSCH overlaps with one of the CCA intervals before the M to-be-transmitted preambles.

Specifically, under the condition that 1 PRACH's CCA interval is configured in the subframe, the CCA interval of the PRACH can coincide with that of the PUSCH.

When M>1, the CCA interval before the to-be-transmitted PUSCH overlaps with one of the CCA interval before the M to-be-transmitted preambles.

The PUSCH here includes users sending the PUSCH only, or sending both the PUSCH and the PUCCH, or sending a Sounding Reference Signal (SRS) after sending the PUSCH/PUCCH, or sending the PUSCH/PUCCH after sending the SRS. The CCA interval location is overlapped and expressed as follows: for example, a user 1 and a user 2 are both detecting the channel state in the CCA interval. After the user 1 detects the channel is idle, a format 0 preamble is sent. When the user 2 detects that the channel is idle, the PUSCH is sent.

Optionally, the M to-be-transmitted preambles occupy at least 1 fixed symbol location or unfixed symbol location in the subframe.

Specifically, the fixed symbol location represents the fixed location of the to-be-transmitted preamble configured in the subframe. The CCA interval location before the corresponding to-be-transmitted preamble is also fixed. When the current unlicensed carrier is detected to be idle, the preamble is not sent. It is necessary to detect that the unlicensed carrier is idle in the configured fixed CCA interval before sending the preamble. The unfixed symbol location represents the location of the to-be-transmitted preamble in the subframe is unfixed, the user equipment can detect the state of the unlicensed carrier in the CCA interval at any time in the subframe, and the preamble can be sent in the idle state.

Optionally, the control signaling also includes carrier type information, the carrier type information is used to represent the current carrier as an unlicensed carrier or an licensed carrier.

From the above embodiments, the base station configures relevant parameters of the to-be-transmitted preambles in the PRACH configuration message, then the transmission of the preamble adapts to the dynamic changes on the Licensed-Assisted Access (LAA) frame structure 3, so as to realize random access under the condition that a small number of uplink subframes are occupied, and reduce the delay of random access.

Figure 2:
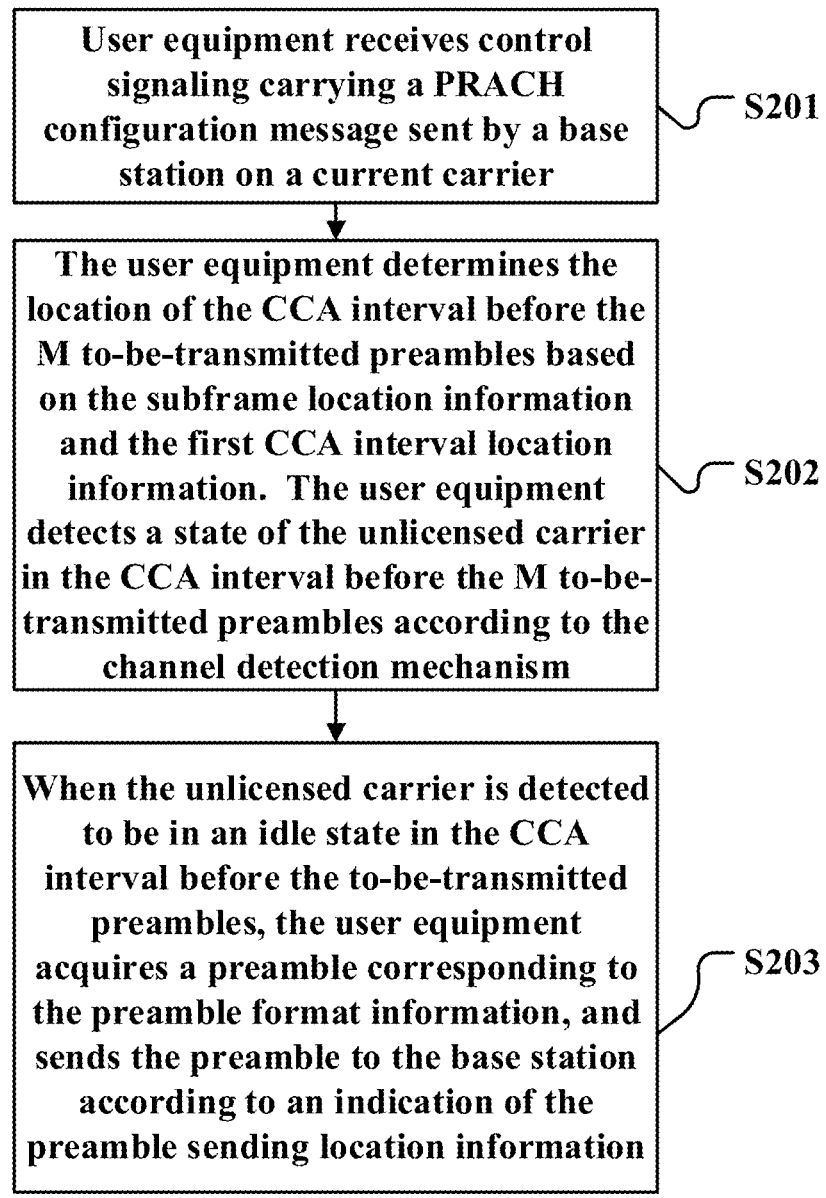
FIG. 2 is a schematic structural diagram of a preamble reception method on an unlicensed carrier provided in an embodiment of the present disclosure.

As shown in FIG. 2, FIG. 2 is a schematic structural diagram of a preamble reception method on an unlicensed carrier provided in an embodiment of the present disclosure, in the embodiment of the present disclosure, the method includes that:

S201: user equipment receives a control signaling carrying PRACH configuration message sent by a base station.

Specifically, the PRACH configuration message is used to indicate relevant parameters of a preamble to be sent. The PRACH configuration message includes subframe location information, first Clear Channel Assessment (CCA) interval location information, a channel detection mechanism, preamble format information and preamble sending location information. The subframe location information indicates a location of a subframe where the to-be-transmitted preambles are located, namely, user equipment has one or more send-able locations of the preambles on one subframe. But in fact, when one of the send-able locations succeeds in sending the preambles, the preambles will not be sent again. In one possible embodiment, the subframe location information can be represented by a wireless frame number and a subframe number. For example, a frame corresponding to the wireless frame number can be any, odd-numbered or even-numbered frame. The subframe number indicates a location of the subframe in the wireless frame. One wireless frame includes ten subframes, numbers being 0-9, the subframe location information is 0 indicates that a subframe in the wireless frame whose subframe number is 0. In the embodiment of the present disclosure, the subframe is an uplink subframe, a special subframe or a downlink Partial subframe. In another possible embodiment, the subframe location information can be represented not by the wireless frame number and the subframe number, but by a relative displacement of a current subframe. For example, a subframe used for sending the PRACH by Downlink Control Information (DCI) signaling is a displacement of the next three subframes relative to a subframe currently used for sending the DCI signaling. That is, if the subframe number used for sending the DCI signaling is N, then the subframe used for sending preamble is N+3. The first CCA interval location information represents a location of a CCA interval in the M to-be-transmitted preambles on the subframe. M is an integer larger than 0. The M CCA intervals are on the subframe indicated by the subframe location information or the previous subframe of the subframe, and the location of the M CCA intervals can be a preset fixed symbol location, or an unfixed symbol location. The preamble format information indicates formats of M to-be-transmitted preambles, and specifically includes a preamble format and a preamble index number. In the embodiment of the present disclosure, the M to-be-transmitted preambles are defined as format 4 preambles. The channel detection mechanism indicates whether the user equipment can detect the unlicensed carrier being in an idle state. A detection method can be a one-shot CCA mechanism or Listen Before Talk (LBT) C4 mechanism based on a random number N. The preamble sending location information indicates a sending location of the M to-be-transmitted preambles on the subframe. The sending location can be M fixed symbol locations preset on the subframe or M unfixed symbol locations.

S202, user equipment determines a location of M PRACH's CCA intervals based on subframe location information and first CCA interval location information, and detects the state of the unlicensed carrier within each PRACH's CCA interval according to the channel detection mechanism.

Specifically, user equipment determines the subframe where the to-be-transmitted preambles according to the subframe location information, determines the CCA interval locations before the M send-able locations of the preambles according to the first CCA interval location information. After determining the CCA interval locations before each send-able locations of the preambles, the state of the unlicensed carrier within the CCA interval of each to-be-transmitted preamble is detected according to the channel detection mechanism. For example, when the channel detection mechanism is one shot CCA mechanism, duration of the CCA interval is 25 us. When the received power of the unlicensed carrier is detected to be less than a preset value in the CCA interval, it indicates that the unlicensed carrier in the CCA interval is idle, and data can be transmitted on the unlicensed carrier. When the channel detection mechanism is a Listen Before Talk (LBT) C4 mechanism based on random number, the channel is detected in the CCA interval, and the channel is first detected with defer period (16 us+L×9 us) as the time unit. When in the defer period time, the received power of the unlicensed carrier is detected to be consistently less than a preset value, then take a random number N from 1~q (q is the competitive window value), and with another time, such as 9 us, as the unit to detect the channel. When the received power of the unlicensed carrier is detected to be consistently less than a preset value within 9 us, then N−1, and detects the channel idleness in the unit of 9 us. When the received power of the unlicensed carrier is not detected to be consistently less than a preset value within 9 us, then N−1, after the channel is detected to be idle in the defer period, the channel is detected in 9 us. When the random number is reduced to 0, it indicates that the unlicensed carrier is idle, and data can be transmitted normally.

S203, when the unlicensed carrier is detected to be in an idle state in the CCA interval before the to-be-transmitted preambles, the user equipment acquires a preamble corresponding to the preamble format information, and sends the preamble to the base station according to an indication of the preamble sending location information. The preamble format information includes a preamble format number and a preamble index number.

Optionally, the PUSCH configuration message also includes: a second CCA interval location information, and the second CCA interval location information represents the location of the CCA interval of the sending PUSCH configured by the base station to a user on the subframe or the previous subframe. The CCA interval of the PUSCH occupies at most N symbols at the head of the subframe or at the tail of the previous subframe of the subframe.

Optionally, before the user equipment receiving the control signaling carrying the PRACH configuration message sent by the base station, also includes that:

The user equipment determines whether the current carrier is an unlicensed carrier based on the carrier type information carried in the RRC signaling, and if so, carries out the control signaling that the user equipment receives a carried PRACH configuration message sent by the base station.

Optionally, a sending location of the M send-able locations of the preambles in the subframe is 1 or more fixed symbol locations or unfixed symbol locations.

Specifically, the fixed symbol location represents the fixed location of the to-be-transmitted preamble configured in the subframe. The CCA interval location before the corresponding to-be-transmitted preamble is also fixed. When the current unlicensed carrier is detected to be idle, the preamble is not sent. It is necessary to detect that the unlicensed carrier is idle in the configured fixed CCA interval before sending the preamble. The unfixed symbol location represents the location of the to-be-transmitted preamble in the subframe is unfixed, the user equipment can detect the state of the unlicensed carrier in the CCA interval at any time in the subframe, and the preamble can be sent in the idle state.

Figure 3:
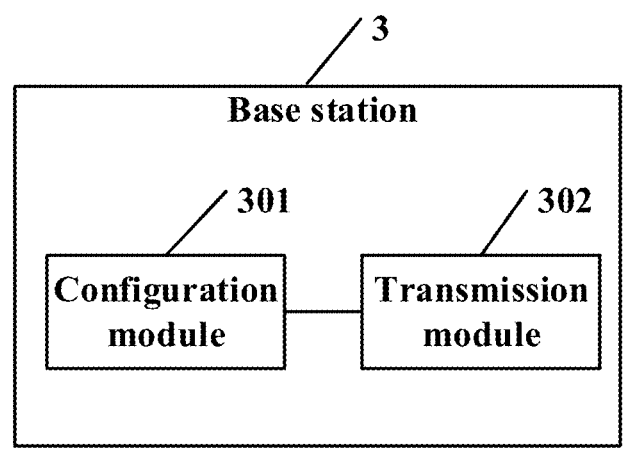
FIG. 3 is a structure diagram of a base station provided in an embodiment of the present disclosure.

As shown in FIG. 3, is a structure diagram of a base station provided in an embodiment of the present disclosure. The base station of the embodiment of the present disclosure is used to execute the preamble configuration method on an unlicensed carrier in FIG. 1, the terms and procedures involved being those described in the embodiments of FIG. 1. A base station 3 includes: a configuration module 301 and a transmission module 302.

The configuration module 301 configured to configure PRACH configuration information. The PRACH configuration information includes subframe location information, first Clear Channel Assessment (CCA) interval location information, a channel detection mechanism, preamble format information and preamble sending location information. The subframe location information indicates a location of a subframe where M to-be-transmitted preambles are located, the subframe is an uplink subframe, a special subframe or a downlink Partial subframe. The first CCA interval location information represents a location of a CCA interval on the subframe or on a previous subframe of the subframe before each preamble in the M send-able locations of the preambles. The channel detection mechanism is used for indicating whether user equipment detects that the unlicensed carrier is in an idle state. The preamble format information indicates that the to-be-transmitted preambles are format 4 preambles. The preamble sending location information indicates sending locations of the M to-be-transmitted preambles in the subframe, M is an integer larger than 0.

The transmission module 302 configured to send control signaling carrying the PRACH configuration message to the user equipment. The control signaling includes RRC signaling and/or DCI signaling.

Optionally, the PUSCH configuration message also includes: a second CCA interval location information, and the second CCA interval location information represents the location of the CCA interval before the to-be-transmitted PUSCH configured by the base station to a user on the subframe or the previous subframe. The CCA interval before the to-be-transmitted PUSCH occupies at most N symbols at the head of the subframe or at the tail of the previous subframe of the subframe.

Optionally, the length of CCA interval before each to-be-transmitted preamble is less than or equal to the length of CCA interval before the to-be-transmitted PUSCH.

Optionally, the CCA interval before each to-be-transmitted preamble and the corresponding to-be-transmitted preamble occupy consecutive N+2 symbols.

Optionally, N is 1 or 2. For example, when using one shot CCA channel detection mechanism, N=1. When using LBT C4 channel detection mechanism, N=2.

Optionally, the CCA interval before the to-be-transmitted PUSCH overlaps with one of the CCA interval before the M to-be-transmitted preambles.

Optionally, the M to-be-transmitted preambles occupy at least 1 fixed symbol location or unfixed symbol location in the subframe.

Optionally, the control signaling also includes carrier type information, the carrier type information is used to represent the current carrier as an unlicensed carrier or an licensed carrier.

The embodiment of the present disclosure and the method embodiment of FIG. 1 are based on the same concept, and the technical effects thereof are also the same. The processes in detail can refer to the description of the method embodiment 1, and are not repeated here.

Figure 4:
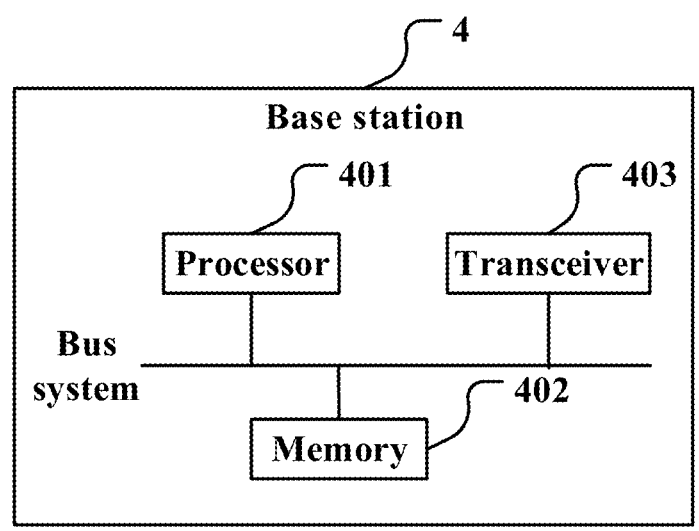
FIG. 4 is a structure diagram of a base station provided in another embodiment of the present disclosure.

FIG. 4 shows a structure diagram of a base station of another embodiment in the present disclosure. In the embodiment of the present disclosure, a base station 4 includes a processor 401, a memory 402 and a transceiver 403. The transceiver 403 is used to send and receive data from external devices. A number of the processor 401 of the base station 4 maybe one or more than one. In some embodiments of the present disclosure, the processor 401, the memory 402 and the transceiver 403 can be connected through a bus system or in other ways. The base station 4 can be used to execute the method shown in FIG. 1. For the meaning of the terms involved in the embodiment and examples may refer to the corresponding embodiments in FIG. 1. Those are not repeated here.

The memory 402 stores program codes. The processor 401 is used to invoke the program codes stored in the memory 402 to execute the following operations:

Configuring PRACH configuration information. The PRACH configuration information includes subframe location information, first CCA interval location information, a channel detection mechanism, preamble format information and preamble sending location information. The subframe location information indicates a subframe where M to-be-transmitted preambles are located, the subframe is an uplink subframe, a special subframe or a downlink Partial subframe. The first CCA interval location information represents a location of a CCA interval on the subframe or on a previous subframe of the subframe before each preamble in the M send-able locations of the preambles. The channel detection mechanism is used for indicating whether user equipment detects that the unlicensed carrier is in an idle state. The preamble format information indicates that the to-be-transmitted preambles are format 4 preambles. The preamble sending location information indicates sending locations of the M to-be-transmitted preambles in the subframe, M is an integer larger than 0.

Sending control signaling carrying the PRACH configuration message to the user equipment. The control signaling includes RRC signaling and/or DCI signaling.

In one possible embodiment of the present disclosure, the control signaling also includes PUSCH configuration message, and the PUSCH configuration message includes a second CCA interval location information, and the second CCA interval location information represents the location of the CCA interval before the to-be-transmitted PUSCH configured by the base station to a user on the subframe or the previous subframe. The CCA interval before the to-be-transmitted PUSCH occupies at most N symbols at the head of the subframe or at the tail of the previous subframe of the subframe.

In one possible embodiment of the present disclosure, the length of CCA interval before each to-be-transmitted preamble is less than or equal to the length of CCA interval before the to-be-transmitted PUSCH.

In one possible embodiment of the present disclosure, the CCA interval before each to-be-transmitted preamble and the corresponding to-be-transmitted preamble occupy consecutive N+2 symbols.

In one possible embodiment of the present disclosure, N is 1 or 2.

In one possible embodiment of the present disclosure, the CCA interval before the to-be-transmitted PUSCH overlaps with one of the CCA interval before the M to-be-transmitted preambles.

In one possible embodiment of the present disclosure, the M to-be-transmitted preambles occupy at least 1 fixed symbol location or unfixed symbol location in the subframe.

In one possible embodiment of the present disclosure, the control signaling also includes carrier type information, the carrier type information is used to represent the current carrier as an unlicensed carrier or an licensed carrier.

Figure 5:
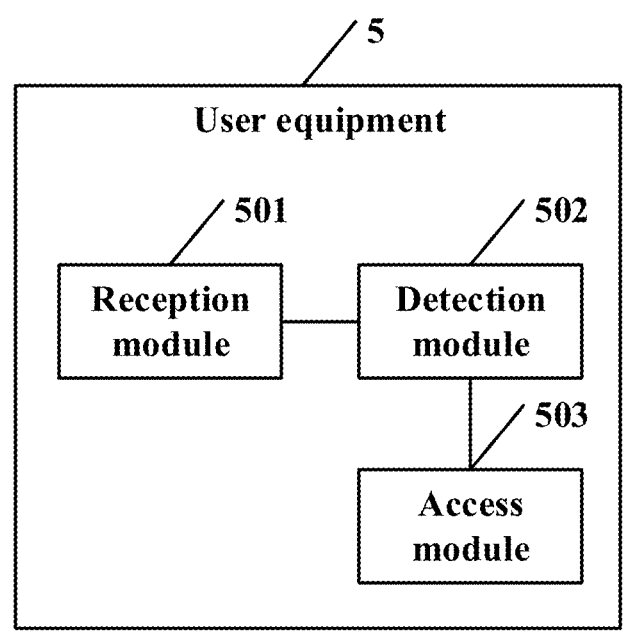
FIG. 5 is a structure diagram of user equipment provided in an embodiment of the present disclosure.

FIG. 5 shows a structure diagram of user equipment provided in an embodiment of the present disclosure. The user equipment of the embodiment of the present disclosure is used to execute the preamble reception method on an unlicensed carrier as in FIG. 2, the terms and procedures involved are described in the embodiments of FIG. 2. The user equipment 5 includes: a reception module 501, a detection module 502 and an access module 503.

The reception module 501 configured to receive control signaling carrying a PRACH configuration message sent by a base station on a current carrier. The control signaling includes a RRC signaling and/or a DCI signaling. The PRACH configuration message includes subframe location information, first CCA interval location information, a channel detection mechanism, preamble format information, and preamble sending location information. The subframe location information indicates a subframe where M to-be-transmitted preambles are located. The subframe is an uplink subframe, a special subframe or a downlink partial subframe. The first CCA interval location information represents a location of a CCA interval before each preamble in the M to-be-transmitted preambles on the subframe or on a previous subframe of the subframe. The channel detection mechanism is used for indicating whether the user equipment detects that the unlicensed carrier is in an idle state. The preamble format information indicates that the preambles are format 4 preambles. The preamble sending location information indicates at least 1 sending location of the to-be-transmitted format 4 preambles in the subframe.

The detection module 502 configured to determine the location of the CCA interval before the M to-be-transmitted preambles based on the subframe location information and the first CCA interval location information, and detect a state of the unlicensed carrier in the CCA interval before the M to-be-transmitted preambles according to the channel detection mechanism.

The access module 503 configured to acquire a preamble corresponding to the preamble format information when the unlicensed carrier is detected to be in an idle state in the CCA interval before the to-be-transmitted preambles, and send the preamble to the base station according to an indication of the preamble sending location information.

Optionally, the control signaling includes the PUSCH configuration message, the PUSCH configuration message includes: a second CCA interval location information, and the second CCA interval location information represents the location of the CCA interval before the to-be-transmitted PUSCH configured by the base station to a user on the subframe or the previous subframe. The CCA interval of the to-be-transmitted PUSCH occupies at most N symbols at the head of the subframe or at the tail of the previous subframe of the subframe.

Optionally, the method is characterized by further including that:

A determination module configured to determine whether the current carrier is an unlicensed carrier based on the carrier type information carried in the RRC signaling, and if so, indicate the reception module to start to work.

Optionally, the M to-be-transmitted preambles occupy at least 1 fixed symbol location or unfixed symbol location in the subframe.

The embodiment of the present disclosure and the method embodiment of FIG. 2 are based on the same concept, and the technical effects thereof are also the same. The processes in detail can refer to the description of the method embodiment 2, and are not repeated here.

Figure 6:
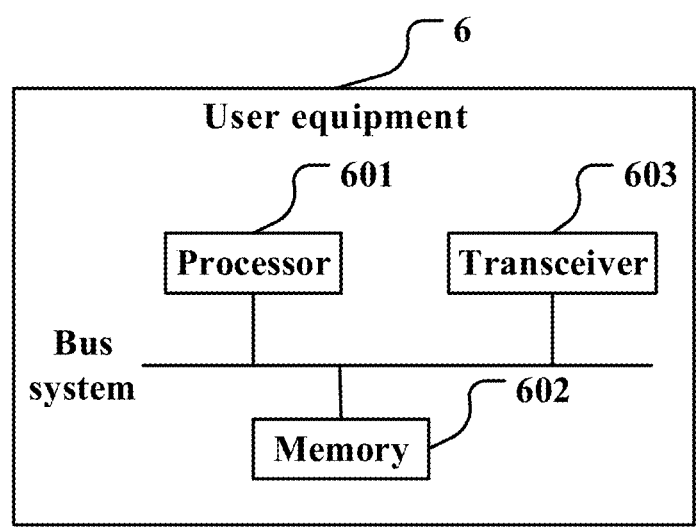
FIG. 6 is a structure diagram of user equipment provided in another embodiment of the present disclosure.

FIG. 6 shows a structure diagram of user equipment of another embodiment in the present disclosure. In the embodiment of the present disclosure, the user equipment 6 includes a processor 601, a memory 602 and a transceiver 603. The transceiver 603 is used to send and receive data from external devices. A number of the processor 601 of the user equipment 6 maybe one or more than one. In some embodiments of the present disclosure, the processor 601, the memory 602 and the transceiver 603 can be connected through a bus system or in other ways. The user equipment 6 can be used to execute the method shown in FIG. 2. For the meaning of the terms involved in the embodiment and examples may refer to the corresponding embodiments in FIG. 2. Those are not repeated here.

The memory 602 stores program codes. The processor 601 is used to invoke the program codes stored in the memory 602 to execute the following operations:

Receiving control signaling carrying a PRACH configuration message sent by a base station on a current carrier. The control signaling includes a RRC signaling and/or a DCI signaling. The PRACH configuration message includes subframe location information, first CCA interval location information, a channel detection mechanism, preamble format information, and preamble sending location information. The subframe location information indicates a subframe where M to-be-transmitted preambles are located. The subframe is an uplink subframe, a special subframe or a downlink partial subframe. The first CCA interval location information represents a location of a CCA interval before each preamble in the M to-be-transmitted preambles on the subframe or on a previous subframe of the subframe. The channel detection mechanism is used for indicating whether the user equipment detects that the unlicensed carrier is in an idle state. The preamble format information indicates that the preambles are format 4 preambles. The preamble sending location information indicates at least 1 sending location of the to-be-transmitted format 4 preambles in the subframe.

Determining the location of the CCA interval before the M to-be-transmitted preambles based on the subframe location information and the first CCA interval location information, and detecting a state of the unlicensed carrier in the CCA interval before the M to-be-transmitted preambles according to the channel detection mechanism.

Acquiring a preamble corresponding to the preamble format information when the unlicensed carrier is detected to be in an idle state in the CCA interval before the to-be-transmitted preambles, and sending the preamble to the base station according to an indication of the preamble sending location information.

In one possible embodiment of the present disclosure, the control signaling includes the PUSCH configuration message, the PUSCH configuration message includes a second CCA interval location information, and the second CCA interval location information represents the location of the CCA interval before the to-be-transmitted PUSCH configured by the base station to a user on the subframe or the previous subframe. The CCA interval of the to-be-transmitted PUSCH occupies at most N symbols at the head of the subframe or at the tail of the previous subframe of the subframe.

In one possible embodiment of the present disclosure, before the processor 601 receiving the control signaling carrying the PRACH configuration message sent by the base station, also includes that:

Determining whether the current carrier is an unlicensed carrier based on the carrier type information carried in the RRC signaling, and if so, carries out the control signaling that the user equipment receives a carried PRACH configuration message sent by the base station.

In one possible embodiment of the present disclosure, the M to-be-transmitted preambles occupy at least 1 fixed symbol location or unfixed symbol location in the subframe.

The user equipment provided by the embodiments of the present disclosure includes, but is not limited to, user equipment equipped with iOS®, Android®, Microsoft® or other operating system, such as those in a mobile phone. Other user equipment may also be used, such as a laptop or a tablet or a desktop computer with a touch-sensitive surface (e.g., a touch screen display and/or a touch pad).

User equipment including a display and a touch-sensitive surface is hereinafter described. It should be understood, however, that the user equipment can include one or more other physical user interface devices, such as a physical keyboard, a mouse, and/or a joystick.

User equipment generally supports a variety of applications, such as one or more of a drawing application, a rendering application, a word processing application, a web page creation application, a disc editing application, a spreadsheet application, a game application, a phone application, a video conferencing application, an email application, an instant messaging application, a workout support application, a photo management application, a digital camera application, a digital video camera application, a web browsing application, a digital music player application, and/or a digital video player application.

Applications that can be executed on the user equipment can use at least one shared physical user interface device, such as a touch-sensitive surface. One or more functions of the touch-sensitive surface and corresponding information displayed on the terminal may be adjusted and/or changed from one application to a next application, and/or adjusted and/or varied within applications. In this way, the shared physical architecture of the user equipment, such as a touch-sensitive surface, can support applications with a user interface that is intuitive to the user.

Persons of ordinary skill in the art can understand that all or part of the processes of the above embodiments may be implemented by executing a computer program by related hardware. The program may be stored in a computer readable storage medium. The program, when executed, may implement the flow of the method embodiments as described above. The storage medium may be a magnetic disk, an optical disk, a read-only memory (ROM), or a random access memory (RAM).

The above mentioned descriptions are merely preferred embodiments of the present disclosure, and certainly, should not limit the scope of the present disclosure. Thus, any modification and equivalent according to the claims of the present disclosure, should be still within the scope of the present disclosure.

We claim:

1. A preamble configuration method on an unlicensed carrier, comprising:
   configuring, by a base station, a Physical Random Access Channel (PRACH) configuration message, the PRACH configuration message comprising subframe location information, first Clear Channel Assessment (CCA) interval location information, a channel detection mechanism, preamble format information, and preamble sending location information; the subframe location information representing a location of a subframe where M to-be-transmitted preambles are located, the subframe being an uplink subframe, a special subframe or a downlink partial subframe; the first CCA interval location information representing a location of a CCA interval before each preamble in the M to-be-transmitted preambles on the subframe or on a previous subframe of the subframe; the channel detection mechanism indicating whether to indicate user equipment to detect an idle state of the unlicensed carrier; the preamble format information representing that the to-be-transmitted preambles are format 4 preambles; the preamble sending location information representing sending locations of the M to-be-transmitted preambles in the subframe, M being an integer that is larger than 0; and
   sending, by the base station, control signaling carrying the PRACH configuration message to the user equipment; the control signaling comprising Radio Resource Control (RRC) signaling and/or Digital Copyright Identifier (DCI) signaling.

2. The method of claim 1, wherein the control signaling comprises a Physical Uplink Shared Channel (PUSCH) configuration message, the PUSCH configuration message comprising:
   a second CCA interval location information, and the second CCA interval location information representing the location of the CCA interval before the to-be-transmitted PUSCH configured by the base station to a user on the subframe or the previous subframe, the CCA interval before the to-be-transmitted PUSCH occupying at most N symbols at a head of the subframe or at an end of the previous subframe of the subframe.

3. The method of claim 2, wherein a length of a CCA interval before each to-be-transmitted preamble is less than or equal to a length of a CCA interval before the to-be-transmitted PUSCH.

4. The method of claim 2, wherein, the CCA interval before each to-be-transmitted preamble and a corresponding to-be-transmitted preamble occupy N+2 consecutive symbols.

5. The method of claim 2, wherein N is 1 or 2.

6. The method of claim 2, wherein the CCA interval before the to-be-transmitted PUSCH overlaps with one of CCA intervals before the M to-be-transmitted preambles.

7. The method of claim 1, wherein the control signaling further comprises carrier type information, the carrier type information is used to represent whether a current carrier is an unlicensed carrier or a licensed carrier.

8. A preamble transmission method on an unlicensed carrier, comprising:
receiving, by user equipment, control signaling carrying a Physical Random Access Channel (PRACH) configuration message sent by a base station on a current carrier; the control signaling comprising Radio Resource Control. (RRC) signaling and/or Digital Copyright Identifier (DCI) signaling; the PRACH configuration message comprising subframe location information, first Clear Channel Assessment (CCA) interval location information, a channel detection mechanism, preamble format information, and preamble sending location information; the subframe location information representing a subframe where M to-be-transmitted preambles being located, the subframe being an uplink subframe, a special subframe or a downlink partial subframe; the first CCA interval location information representing a location of a CCA interval before each preamble in the M to-be-transmitted preambles on the subframe or on a previous subframe of the subframe; the channel detection mechanism indicating whether to indicate user equipment to detect an idle state of the unlicensed carrier; the preamble format information representing that the preambles are format 4 preambles; the preamble sending location information representing a least one sending location of the to-be-transmitted format 4 preambles in the sublime;
determining, by the user equipment, the location of the CCA interval before the M to-be-transmitted preambles based on the subframe location information and the first CCA interval location information, and detecting a state of the unlicensed carrier in the CCA interval before the M to-be-transmitted preambles according to the channel detection mechanism; and
acquiring, by the user equipment, a preamble corresponding to the preamble format information, and sending the preamble to the base station according to an indication of the preamble sending location information, when the unlicensed carrier being detected to be in an idle state in the CCA interval before the to-be-transmitted preambles.

9. The method of claim 8, wherein the control signaling further comprises Physical Uplink Shared Channel (PUSCH) configuration message, the PUSCH configuration message comprising a second CCA interval location information, the second CCA interval location information representing the location of the CCA interval before the to-be-transmitted PUSCH configured by the base station to a user on the subframe or the previous subframe, the CCA interval of the to-be-transmitted PUSCH occupying at most N symbols at a bead of the subframe or at an end of the previous subframe of the subframe.

10. The method of claim 8, before the user equipment receives the control signaling carrying the PRACH configuration message sent by the base station, further comprising:
determining, by the user equipment, whether the current carrier is an unlicensed carrier based on the carrier type information carried in the RRC signaling, and
when the current carrier is the unlicensed carrier, receiving, by the user equipment, control signaling carrying the PRACH configuration message sent by the base station on the current carrier.

11. User equipment, comprising:
at least one processor; and
a storage device storing a plurality of instructions, which when executed by the processor, causes the at least one processor to:
receive control signaling carrying a Physical Random Access Channel (PRACH) configuration message sent by a base station on a current carrier; the control signaling comprising Radio Resource Control (RRC) signaling and/or Digital Copyright Identifier (DCI) signaling; the PRACH configuration message comprising subframe location information, first Clear Channel Assessment (CCA) interval location information, a channel detection mechanism, preamble format information, and preamble sending location information; the subframe location information representing a subframe where M to-be-transmitted preambles being located, the subframe being an uplink subframe, a special subframe or a downlink partial subframe; the first CCA interval location information representing a location of a CCA interval before each preamble in the M to-be-transmitted preambles on the subframe or on a previous subframe of the subframe; the channel detection mechanism indicating whether to indicate user equipment to detect an idle state of the unlicensed carrier; the preamble format information representing that the preambles are format 4 preambles; the preamble sending location information representing at least one sending location of the to-be-transmitted format 4 preambles in the subframe;
determine the location of the CCA interval before the M to-be-transmitted preambles based on the subframe location information and the first CCA interval location information, and detect a state of the unlicensed carrier in the CCA interval before the M to-be-transmitted preambles according to the channel detection mechanism; and
acquire a preamble corresponding to the preamble format information, and send the preamble to the base station according to an indication of the preamble sending location information, when the unlicensed carrier is detected to be in an idle state in the CCA interval before the to-be-transmitted preambles.

12. The user equipment of claim 11, wherein the control signal in further comprises Physical Uplink Shared Channel (PUSCH) configuration message, the PUSCH configuration message comprising a second CCA interval location information, the second CCA interval location information representing the location of the CCA interval before the to-be-transmitted PUSCH configured by the base station to a user on the subframe or the previous subframe, the CCA interval of the to-he-transmitted PUSCH occupying at most N symbols at a head of the subframe or at end of the previous subframe the subframe.

13. The user equipment of claim 11, wherein the at least one processor further:
determines whether the current carrier is an unlicensed carder based on the carrier type information carried in the RRC signaling, and
when the current carrier is the unlicensed carrier, receives, by the user equipment, control signaling carrying the PRACH configuration message sent by the base station on the current carrier.

14. The user equipment of claim 11, wherein the base station configures to configure the PRACH configuration message, the PRACH cc configuration message comprising subframe location information, first CCA interval location information, the channel detection mechanism, preamble format information, and preamble sending location information; the subframe location information representing a location of a subframe where M to-be-transmitted preambles are located, the subframe being an uplink subframe, a special subframe or a downlink partial subframe; the first CCA interval location information representing a location of a CCA interval before each preamble in the M to-be-transmitted preambles on the subframe or on a previous subframe of the subframe; the channel detection mechanism indicating whether to indicate user equipment to detect an idle state of the unlicensed carrier; the preamble format information representing that the to-be-transmitted preambles are format 4 preambles; the preamble sending location information representing sending locations of the M to-be-transmitted preambles in the subframe M being an integer that is larger than 0; and sends control signaling carrying the PRACH configuration message to the user equipment; the control signaling comprising RRC signaling and/or DCI signaling.

15. The user equipment of claim 14, wherein the control signaling further comprises the PUSCH configuration message, the PUSCH configuration message comprising:

a second CCA interval location information, and the second CCA interval location information representing the location of the CCA interval before the to-be-transmitted PUSCH configured by the base station to a user on the subframe or the previous subframe, the CCA interval before the to-be-transmitted PUSCH occupying at most N symbols at a head of the subframe or at an end of the previous subframe of the subframe.

16. The user equipment of claim 14, wherein a length of a CCA interval before each to-be-transmitted preamble is less than or equal to a length of a CCA interval before the to-be-transmitted PUSCH.

17. The user equipment of claim 14, wherein the CCA interval before each to-be-transmitted preamble and a corresponding to-be-transmitted preamble occupy N+2 consecutive symbols.

18. The user equipment of claim 14, wherein N is 1or 2.

19. The user equipment of claim 14, wherein the CCA interval before the to-be-transmitted PUSCH overlaps with one of CCA intervals before the M to-be-transmitted preambles.

20. The user equipment of claim 14, wherein the control signaling further comprises carrier type information, the carrier type information is used to represent whether a current carrier is an unlicensed carrier or a licensed carrier.

* * * * *